Patented Sept. 23, 1924.

1,509,156

UNITED STATES PATENT OFFICE.

ARTHUR H. LAWRY, OF GOLDFIELD, NEVADA.

PROCESS OF RECOVERING METALS FROM CYANIDE SOLUTIONS.

No Drawing.  Application filed August 22, 1922. Serial No. 583,654.

*To all whom it may concern:*

Be it known that I, ARTHUR H. LAWRY, a citizen of the United States of America, residing at Goldfield, in the county of Esmeralda and State of Nevada, have invented certain new and useful Improvements in Processes of Recovering Metals from Cyanide Solutions, of which the following is a specification.

The invention relates to improvements in a process for extracting precious metals from cyanide solutions, and particularly solutions containing gold and silver.

In the art of precipitating cyanide solutions it has been practically the universal practice to employ as a precipitant metallic zinc, but it has been recognized that this precipitant is not as efficient as it might be, inasmuch as it does not produce the most favorable results when recovering metals from a cyanide solution containing a low cyanide content.

It is also well known that when zinc is used there is an appreciable consumption of the cyanide and also a contamination of the cyanide solution by zinc cyanide salts, the most serious disadvantages, however, being failure of the zinc to properly remove the metal in the low cyanide solution and the appreciable consumption of the cyanide.

It has also been proposed to use charcoal manufactured in the usual way from various kinds of wood as a precipitant for gold and silver, although no definite conclusion has been reached as to the real nature of the precipitating action. However, the use of such charcoal, or other forms of carbon, have never been extensively practiced, in view of their inefficiency, particularly because of the comparatively low precipitation of the precious metals from the solution.

The present invention is based on the discovery that where activated or decolorizing carbons are employed as a precipitant for removing precious metals from cyanide solutions that a remarkable recovery of the metals results with a consumption of a minimum quantity of the cyanide. I have discovered that where a cyanide solution is treated with an activated carbon, that the disadvantages incident to the use of zinc and ordinary charcoal precipitants are eliminated, and that a most remarkable precipitation of gold, silver and other precious metals results, with little or no cyanide loss.

Activated charcoal employed by me may be manufactured in accordance with various processes which are now well known and one type of activated charcoal which I have successfully used is a product known as Darco and manufactured by the Darco Corporation of Wilmington, Delaware, and inasmuch as the charcoal can be manufactured by different processes I will not attempt to herein describe processes by which the activated charcoal can be produced, as the production thereof is now so well understood and the great distinction existing between ordinary carbons and charcoal and activated carbons is well appreciated and recognized in all arts.

In the treatment of cyanide solutions, the quantity of the activated carbons may vary, depending upon the value of the precious metals in solution, or upon other conditions, but I have successfully practiced my process by adding 2 pounds of the comminuted activated carbon to 1 ton of a gold bearing cyanide solution containing .15 pounds of cyanide and .55 pounds of lime. It will be understood that in cyanide treatment the comminuted ore and water are mixed in proper proportions, after which the cyanide and preferably a substance such as lime are added, the gold and silver or other precious metals very rapidly going into solution by reason of the presence of the cyanide. For the usual reasons, above mentioned, the solution was of course filtered in the usual manner, whereupon 2 pounds of the activated charcoal to 1 ton of the solution was added, and these substances caused to commingle or contact by agitation or otherwise for a period of two hours, whereupon the solution was again filtered.

The cyanide solution treated by me had a head value of $0.30 per ton, and after the addition of the activated carbon, the tail value was zero, showing that there was a perfect extraction or precipitation of precious metal from the solution, the value of the metal extracted being $0.30 per ton of solution.

In the experiment just referred to there was also little or no perceptible loss or consumption of the cyanide, there being substantially the same quantity of cyanide present in the solution after the precipitation as the amount initially employed. Also, after the precipitation there was a preceptible decrease in the amount of reducing agents present in the cyanide solution. The relative quantities of gold or silver contained in the solution may, of course, vary, and of course, the quantity of lime and cyanide may vary, and the lime does not have to be used in all instances. It is generally employed in the solution for protective purposes, but can in some cases be dispensed with, or other materials may be added for protective purposes, or for the purpose of aiding the action of the solution. Also the period of time necessary for the activated carbon to be in contact with the solution may vary, and, of course, it is not necessary for the activated carbon to be in a finely comminuted state, but the carbon particles may vary in size. Although, in the experiment just referred to, the amount of activated carbon added to the solution was 2 lbs. per ton of solution, a less amount may be used, and the amount of activated carbon necessary to be added to the solution for efficient precipitation of the metals may vary.

One of the unique features which I have discovered that results in the use of an activated carbon or charcoal in the precipitation of precious metals, is the fact that such carbon acts most satisfactorily when employed in precipitating gold and silver from a very weak cyanide solution. Ordinary precipitants are not generally satisfactory for weak solutions, and for this reason it has frequently been necessary with the older types of precipitants to use needlessly increased quantities of cyanide. I attribute this to the physical structure of the activated carbon, which is also well known as activated charcoal, which is manufactured so that it contains clean open pores or cells, thus affording to it a great absorptive and precipitating power, together with a maximum surface area. Such a carbon has also great power of occlusion, and in this particular art it is my discovery that it will act as a precipitant in a manner far above comparison with either zinc, or any other hitherto known carbons.

The properties of this charcoal are now well known, and it is generally recognized that such a carbon is radically different from the ordinary carbons and charcoals. The word "activated" has been accepted as meaning a substance entirely different in properties from the ordinary charcoals. Processes for producing activated carbons are now numerous, and well known, and inasmuch as my invention only relates to the use of such a carbon as a precipitant for cyanide solutions, I will not describe herein processes for the manufacture thereof, as such processes are familiar to those skilled in the art. The product, however, is one which is produced by a charring treatment through a range of temperatures, being of great porositiy, having powers of absorption or occlusion, with maximum surface area, and this invention is predicated upon my discovery that such a product is particularly useful and satisfactory as a precipitant for gold and silver which will enable said metals to be recovered at a minimum cost.

Having thus described my invention, what I claim is:

1. A process for precipitating precious metals from solutions containing no substantial quantity of free cyanide, consisting in introducing to the weak solution an activated carbon, in allowing the carbon to remain in contact with the solution, to precipitate the precious metals, and in filtering the solution to recover the precipitate therefrom.

2. A process of precipitating precious metals from a weak cyanide solution weak in cyanide containing an activated carbon in substantially the proportions of two pounds of activated carbon to one ton of the precious metal bearing cyanide solution containing substantially not more than fifteen pounds of cyanide, in allowing the carbon to remain in contact with the solution to precipitate the precious metals, and in then separating said precipitate from the solution.

3. A process of precipitating precious metals from a cyanide solution so weak as to contain no substantial quantity of free cyanide, which consists in introducing to the solution an activated carbon, in allowing the carbon to remain in contact with the solution to precipitate the precious metals, and in then separating the precipitate from said solution.

In testmony whereof I affix my signature.

ARTHUR H. LAWRY.